US012467295B2

(12) United States Patent
Dirnberger et al.

(10) Patent No.: US 12,467,295 B2
(45) Date of Patent: Nov. 11, 2025

(54) PUSH-PUSH DOOR LATCH AND DOMESTIC ELECTRICAL APPLIANCE EQUIPPED THEREWITH

(71) Applicant: emz-Hanauer GmbH & Co. KGaA, Nabburg (DE)

(72) Inventors: Albert Dirnberger, Neunburg vom Wald (DE); Benjamin Schemela, Schwarzenbach (DE); Karl-Heinz Uhl, Kallmünz (DE)

(73) Assignee: EMZ-HANAUER GMBH & CO. KGAA, Nabburg (DE)

( * ) Notice: Subject to any disclaimer, the term of this patent is extended or adjusted under 35 U.S.C. 154(b) by 233 days.

(21) Appl. No.: 18/073,665

(22) Filed: Dec. 2, 2022

(65) Prior Publication Data

US 2023/0175296 A1 Jun. 8, 2023

(30) Foreign Application Priority Data

Dec. 3, 2021 (DE) ......................... 102021131939.0
Sep. 22, 2022 (DE) ......................... 102022124424.5

(51) Int. Cl.

| | |
|---|---|
| ***E05C 19/06*** | (2006.01) |
| ***D06F 39/14*** | (2006.01) |
| ***E05C 3/24*** | (2006.01) |
| ***E05C 19/02*** | (2006.01) |
| *E05C 19/00* | (2006.01) |

(52) U.S. Cl.
CPC ............ *E05C 19/063* (2013.01); *D06F 39/14* (2013.01); *E05C 3/24* (2013.01); *E05C 19/022* (2013.01)

(58) Field of Classification Search
CPC .... Y10S 292/04; Y10S 292/69; E05C 19/022; E05C 19/063
See application file for complete search history.

(56) References Cited

U.S. PATENT DOCUMENTS 3,603,631 A * 9/1971 White .................. E05C 19/022 292/DIG. 4
3,841,677 A * 10/1974 Guth .................. A47L 15/4259 292/113

(Continued)

FOREIGN PATENT DOCUMENTS

DE 3919458 A1 * 12/1990
DE 19601230 A1 * 7/1997 ............ D06F 37/42

(Continued)

*Primary Examiner* — Carlos Lugo
(74) *Attorney, Agent, or Firm* — Hayes Soloway PC

(57) ABSTRACT

A door latch includes a gripper adjustable between a gripping state and a release state, which gripper, in the gripping state, is able to grip a closing member for holding the door closed which moves relatively closer to the gripper in a closing direction as a door of the domestic appliance is closed, and, in the release state, frees the closing member for opening the door, wherein, when the door is closed, the gripping state of the gripper is released by a relative releasing movement of the closing member carried out in the closing direction; and an electrically controllable displacement mechanism for displacing the gripper, under electrical control, from a retracted position into an advanced position against a restoring spring force, which advanced position, when the closing member is gripped, corresponds to a state in which the door is closed to a lesser degree than in the retracted position.

13 Claims, 8 Drawing Sheets

(56) References Cited

U.S. PATENT DOCUMENTS

| | | | | | |
|---|---|---|---|---|---|
| 5,004,276 | A * | 4/1991 | Hanley | E05C 19/022 | 292/201 |
| 5,072,974 | A * | 12/1991 | Henne | E05C 19/022 | 292/201 |
| 5,174,618 | A * | 12/1992 | Kropf | E05C 3/16 | 292/254 |
| 7,032,936 | B2 * | 4/2006 | Promutico | D06F 37/42 | 292/341.17 |
| 7,066,503 | B2 * | 6/2006 | Smith | F24C 15/022 | 292/201 |
| 7,654,590 | B2 * | 2/2010 | Hapke | A47L 15/4259 | 134/58 DL |
| 8,109,543 | B2 * | 2/2012 | Chirumbolo | E05B 15/101 | 292/201 |
| 9,370,294 | B2 * | 6/2016 | Osvatic | E05C 19/024 | |
| 9,885,141 | B2 * | 2/2018 | Becchio | E05B 47/0009 | |
| 10,851,488 | B2 * | 12/2020 | Kim | E05B 47/0001 | |
| 11,519,125 | B2 * | 12/2022 | Wang | E05C 19/024 | |
| 2015/0238065 | A1 | 8/2015 | Osvatic et al. | | |
| 2019/0040654 | A1 * | 2/2019 | Dirnberger | D06F 39/14 | |
| 2019/0219269 | A1 * | 7/2019 | DeYoung | F24C 15/022 | |

FOREIGN PATENT DOCUMENTS

| | | | |
|---|---|---|---|
| EP | 1460163 | A2 | 9/2004 |
| KR | 20180043750 | A | 4/2018 |
| WO | 2019102403 | A1 | 5/2019 |

* cited by examiner

PUSH-PUSH DOOR LATCH AND DOMESTIC ELECTRICAL APPLIANCE EQUIPPED THEREWITH

CROSS-REFERENCE TO RELATED APPLICATIONS

This application claims priority to German Patent Application 10 2021 131 939.0, filed on Dec. 3, 2021 and German Patent Application No. 10 2022 124 424.5, filed on Sep. 22, 2022, the contents of each are incorporated by reference herein.

FIELD

The present invention relates to a door latch of the push-push type for a domestic electrical appliance.

BACKGROUND

Washing machines and tumble dryers for domestic use sometimes have door latches which operate by the push-push principle. A first pushing action is thereby necessary to close the door latch, in which the user pushes against a door of the domestic appliance in order to close the door. As a result, the door latch moves into a state in which it holds the door closed. In order subsequently to manually open the door again, a further pushing action is necessary, in which the user pushes against the door again and thereby overcomes the holding-closed action of the door latch. Unlike in the case of push-push door latches, in the case of door latches of the push-pull type the door, once it has been closed, can be opened again manually only by pulling. An example of a conventional door latch of the push-push type is disclosed in EP 1 460 163 A2.

The domestic appliances which come into consideration within the scope of the present invention are typically equipped with a door seal, the function of which is to seal the closed door with respect to an appliance main body of the domestic appliance. Hot steam or liquid is thereby to be prevented from escaping during operation of the domestic appliance from an access opening through which, when the door is open, there is access to a working chamber (e.g. interior of a laundry drum) formed in the appliance main body. The door seal is compressed as the door is closed. Compression of the door seal is accompanied by the build-up of a resilient restoring force, which must be overcome by the user on closing the door. This may still be comparatively easy, as long as the door seal is only slightly compressed. The more the door seal is compressed, the greater the force which must be applied to push the door closed still further.

In the case of door latches of the push-push type, it is necessary to match the door latch to the compression behavior of the door seal on closing of the door so that, when the door is closed and the door latch is closed, the second pushing action required to open the door can be carried out by the user with the application an acceptable force. This is because, if the door seal, with the door latch closed, is already compressed very greatly, it may be that the second pushing action is arduous and requires the user to apply a comparatively high force. For weak individuals, for example children or frail elderly individuals, the force that must be applied may possibly be too high.

The suitable mutual matching of the door latch and the door seal is made more difficult by the fact that different specimens of the same model of the domestic appliance can exhibit different force characteristics on closing of the door due to tolerances. Tolerances can occur not only for manufacturing reasons in the production of the individual components of the domestic appliance but also during assembly of the domestic appliance, for example on fitting of the door or the door seal. It is accordingly possible that, in the case of different, notionally structurally identical specimens of a particular appliance model, a different degree of force is required to carry out the first pushing action for closing the door, and consequently a different degree of force is also required to carry out the second pushing action for opening the door. This difference can be judged to be problematic particularly if, in some specimens of an appliance model, the second pushing action requires the application of an unacceptably high force. This could be counteracted by matching the door latch and the door seal to one another in such a way that the door seal generally has to be compressed only comparatively lightly in order to close the door. However, this would entail the risk of leaks during operation of the domestic appliance. Alternatively, individual readjustment work could be carried out on each individual specimen of an appliance. However, the outlay therefor in terms of time and manpower would be considerable.

SUMMARY

The object of the invention is, therefore, to provide a door latch of the push-push type which, while exhibiting high reliability of the sealing function of a door seal, can be operated effortlessly.

In order to achieve this object, the invention provides according to a first aspect a door latch of the push-push type for a domestic electrical appliance, comprising: a gripper which is arranged so as to be adjustable between a gripping state and a release state, which gripper, in the gripping state, is configured to grip a closing member for holding the door closed, the closing member moving relatively closer to the gripper in a closing direction as a door of the domestic appliance is closed, wherein the gripper, in the release state, permits the closing member to be freed for opening the door, wherein, when the door is closed, the gripping state of the gripper can be released by a relative releasing movement of the closing member which is carried out in the closing direction; and an electrically controllable displacement mechanism for displacing the gripper, under electrical control, from a retracted position into an advanced position which, when the closing member is gripped, corresponds to a state in which the door is closed to a relatively lesser degree than in the retracted position.

In the solution according to the invention, the gripper is displaceable between different positions by electrical control of the displacement mechanism, namely at least between a retracted position and an advanced position. In some embodiments, the gripper is arranged so as to be displaceable from the retracted position into the advanced position against a restoring spring force. In the advanced position, the gripper—in comparison with the retracted position—is advanced toward the closing member. The displacement of the gripper from the retracted position into the advanced position is accordingly accompanied—provided that the closing member is thereby gripped, that is to say when the door latch is closed and the closing member is held by the gripper—by an at least partial relaxation of a door seal of the domestic appliance. This facilitates the carrying out of a subsequent relative releasing movement of the closing member (second pushing action) in order to open the door. A less greatly compressed door seal means the application of a lower force to carry out this releasing movement. Even if, in the retracted position of the gripper, the door seal is so greatly compressed that, in the retracted position, the releasing movement can be carried out only with the application of an unduly high force, it can be ensured, by advancing the gripper into the advanced position, that the second pushing action can easily be carried out even by physically weak individuals. Any tolerances in the production of the components of the domestic appliance are not an obstacle to the ease with which the second pushing action can be carried out in the solution according to the invention.

According to some embodiments, the door latch is configured, in the advanced position of the gripper, when the closing member is gripped, to allow the gripping state of the gripper to be released by carrying out the releasing movement of the closing member.

Some embodiments provide that the door latch is configured for a displacement, effected by means of the displacement mechanism, of the gripper from the retracted position into the advanced position while the gripper is in its release state. In such embodiments, the gripper can be moved into the advanced position when the door is open. The user can then close the door. Because the gripper is advanced as the door is closed, only at most a moderate exertion of force is required by the user in order to overcome the resistance of the door seal on closing of the door. It is also conceivable that, in the advanced position of the gripper, closing of the door is possible even without compression of the door seal at all, and that the door seal is compressed only when the gripper is subsequently pulled back into the retracted position.

Some embodiments provide that the door latch is configured for a displacement, effected by means of the displacement mechanism, of the gripper from the retracted position into the advanced position while the closing member is gripped by the gripper. In such embodiments, the gripper can be moved from the retracted position into the advanced position when the door is closed, for example on completion of a working program or a program phase, in order to allow the user to open the door effortlessly by a second pushing action (relative releasing movement of the closing member).

In some embodiments, the door latch is configured for a displacement, effected or at least assisted by the displacement mechanism, of the gripper from the advanced position into the retracted position, in particular while the closing member is gripped by the gripper. Provided that the closing member is thereby gripped by the gripper, it can be ensured by this measure that less force has to be applied by the user for the first pushing action on closing the door. If the door is still open, the gripper can already be moved into the advanced position. For closing the door latch, that is to say for establishing gripping engagement between the closing member and the gripper, the user then has to overcome only any closing resistance force of the door latch and only a relatively low resistance of the door seal. When the gripper is subsequently moved from the advanced position into the retracted position, the force for compressing the door seal further is applied by the displacement mechanism (and optionally additionally by a biasing spring assembly); the user is relieved of this task.

In some embodiments, a displacement, effected by means of the displacement mechanism, of the gripper from the advanced position into the retracted position causes a blocking formation to become active in the sense of blocking the gripper against transfer into the release state. In this way, locking of the gripper in its gripping state can be achieved in the retracted position. For opening the door latch, the gripper must in these embodiments first be moved from the retracted position into the advanced position again. Only in the advanced position is (non-violent) opening of the door possible.

Some embodiments provide that the displacement mechanism is configured, in the advanced position of the gripper, when the closing member is gripped, to release the gripping state of the gripper under electrical control. Such a configuration of the displacement mechanism allows an automatic opening function to be implemented for the door latch. Automatic opening of the door latch and thus also of the door can be expedient, for example, at the end of an operating run of the domestic appliance in order to allow moist air to escape from the working chamber of the domestic appliance. The possibility of manual opening (second pushing action) is unaffected by the described possibility of automatic opening.

According to some embodiments, the displacement mechanism comprises an electrically controllable, in particular electromotive, actuator and a control member, which is in drive connection with the actuator, for controlling the position of the gripper. The control member is adjustable by activation of the actuator into different control positions, of which a first control position corresponds to the retracted position of the gripper and a second control position corresponds to the advanced position of the gripper. The control member is additionally designed with at least one blocking formation, which in the first control position is able to effect blocking of the gripper against transfer from the gripping state into the release state and in the second control position allows the gripper to be transferred into the release state.

The at least one blocking formation can be a blocking formation for direct blocking cooperation with the gripper or/and a blocking formation for indirect blocking cooperation with the gripper. Direct blocking cooperation is present when the blocking action arises through direct mechanical contact between the blocking formation in question and the gripper. By contrast, indirect blocking cooperation is present when the blocking formation in question cooperates mechanically with a component (e.g. in the form of a locking lever) that is separate from the gripper and in turn cooperates mechanically with the gripper. Thus, it is conceivable that a biasing force acts on the gripper which biases the gripper, in the gripping state, for adjustment in the direction toward the release state. A locking component that is separate from the gripper can serve to hold the gripper in the gripping state and thereby prevent adjustment into the release state. The locking component can be movably arranged so that, by moving the locking component away, the gripper can be freed and can be transferred into its release state. In such embodiments, the control member can have a blocking formation which cooperates directly with the gripper and is able to block the gripper, in the gripping state thereof, against adjustment into the release state. Alternatively, or additionally, the control member can have a blocking formation which cooperates mechanically with the locking component and is able to block the locking component against moving away.

Some embodiments provide that the control member is adjustable into a third control position which, when seen from the first control position, is located beyond the second control position. When the control member is moved from the second control position into the third control position, a release formation arranged on the control member is able to act in the sense of releasing the gripping state of the gripper. The adjustability of the control member into the third control position allows an automatic opening function of the door latch to be implemented.

The control member is in the form of a linear slide, for example. Movement patterns other than a linear slide are of course not excluded for the control member within the scope of the present invention.

In some embodiments, the displacement mechanism comprises a gear train arranged in the force transmission path between the actuator and the control member. The control member thereby has a tooth system for meshing with an output wheel of the gear train. A reduction function can be implemented with the gear train, which allows a comparatively rapidly rotating electric motor to be used as the actuator.

Some embodiments provide that the door latch comprises a gripper assembly which comprises a movably arranged carrier (gripper carrier) in mechanical drive coupling with the displacement mechanism. The gripper is mounted on the carrier so as to be adjustable relative thereto between the gripping state and the release state. There is additionally mounted on the carrier a locking element which is movable relative to the gripper and which serves to secure the gripper in the gripping state thereof against movement into the release state. The gripper assembly is displaceable as a unit, that is to say carrier, gripper and locking element together, between the advanced position and the retracted position without changing the state of the gripper, that is to say the gripping state or the release state, during or as a result of the displacement.

Some embodiments provide that the gripper is in the form of a rotary gripper having a gripping mouth which is delimited between two jaws and in which the rotary gripper is able to hold the closing member captive in the gripping state. The gripping state and the release state thereby correspond to different rotation positions of the rotary gripper, wherein the rotary gripper in the gripping state is spring-biased for rotation in the direction toward the release state. In such embodiments, the rotary gripper is rotatably mounted on a movably arranged gripper carrier. There is further mounted on the gripper carrier a locking element which is arranged so as to be movable relative to the gripper carrier and the rotary gripper and which in the gripping state of the rotary gripper is able to come into locking engagement with the rotary gripper, which locks the rotary gripper against rotation in the direction toward the release state but can be released by the relative releasing movement of the closing member. A displacement of the rotary gripper from the retracted position into the advanced position is thereby accompanied by a displacement of the gripper carrier.

In some embodiments, the gripper carrier is spring-biased in such a way that a displacement of the rotary gripper from the retracted position into the advanced position is accompanied by a displacement of the gripper carrier against spring force. The spring force acting on the carrier can in these embodiments be used to overcome the resistance which opposes further compression of the door seal as the rotary gripper is guided back from the advanced position into the retracted position.

The gripper carrier can be a pivotably arranged carrier lever or a linearly movably arranged carrier slide.

Some embodiments provide that the displacement mechanism comprises a control member for controlling the position of the rotary gripper, which control member is formed separately from the gripper carrier, is arranged so as to be movable, in particular linearly movable, relative to the rotary gripper along a rotation plane of the rotary gripper and can be driven under electrical control, wherein there acts between the control member and the gripper carrier or/and the rotary gripper a control path-path follower formation having a control path and a path follower which travels along the control path as the control member is moved. The control path has different path sections, of which a first defines the retracted position of the rotary gripper and a second defines the advanced position of the rotary gripper.

According to some embodiments, the displacement mechanism comprises an electromotive actuator, wherein the gripper carrier is in meshing drive connection with a drive wheel driven by the actuator.

According to a further aspect, the invention provides a domestic laundry treatment appliance, which is, for example, a washing machine or a combined appliance for washing and drying laundry (so-called washer-dryer). The laundry treatment appliance comprises: an appliance main body having a drum, rotatably mounted therein, for receiving items of laundry to be treated; a door for closing an access opening to the drum; a door latch; and a door seal for sealing the access opening, which door seal acts between the door and the appliance main body and is compressed as the door is closed. The door latch comprises a gripper which is arranged on one of the appliance main body and the door so as to be adjustable between a gripping state and a release state, which gripper, in the gripping state, is configured to grip a closing member for holding the door closed, the closing member arranged on the other of the appliance main body and the door and moving relatively closer to the gripper in a closing direction as the door is closed, wherein the gripper, in the release state, permits the closing member to be freed for opening the door. When the door is closed, the gripping state of the gripper can be released by a relative releasing movement of the closing member which is carried out in the closing direction. The door latch additionally comprises an electrically controllable displacement mechanism for displacing the gripper, under electrical control, from a retracted position into an advanced position. The advanced position corresponds, when the closing member is gripped, to a state of lower compression of the door seal than the retracted position.

A door latch according to the invention can be used not only in laundry treatment appliances but also in other types of domestic appliance. According to yet a further aspect, the invention therefore provides a domestic dishwasher, comprising: a dishwashing container having a dishwashing chamber formed therein for receiving dishes to be cleaned; a door, which is mounted on the dishwashing container so as to be pivotable about a horizontal pivot axis close to the floor, for closing an access opening to the dishwashing chamber; a door latch having a gripper which is arranged on one of the dishwashing container and the door so as to be adjustable between a gripping state and a release state, which gripper, in the gripping state, is configured to grip a closing member for holding the door closed, the closing member arranged on the other of the dishwashing container and the door and moving relatively closer to the gripper in a closing direction as the door is closed, wherein the gripper, in the release state, permits the closing member to be freed for opening the door, wherein, when the door is closed, the gripping state of the gripper can be released by a relative releasing movement of the closing member which is carried out in the closing direction; and a door seal for sealing the access opening, which door seal acts between the door and the dishwashing container and is compressed as the door is closed, wherein the door latch further comprises an electrically controllable displacement mechanism for displacing the gripper, under electrical control, from a retracted position into an advanced position which, when the closing member is gripped, corresponds to a state of lower compression of the door seal than the retracted position.

BRIEF DESCRIPTION OF THE DRAWINGS

Embodiments of the present invention will be explained further hereinbelow with reference to the accompanying drawings, in which.

DETAILED DESCRIPTION

Figure 1:
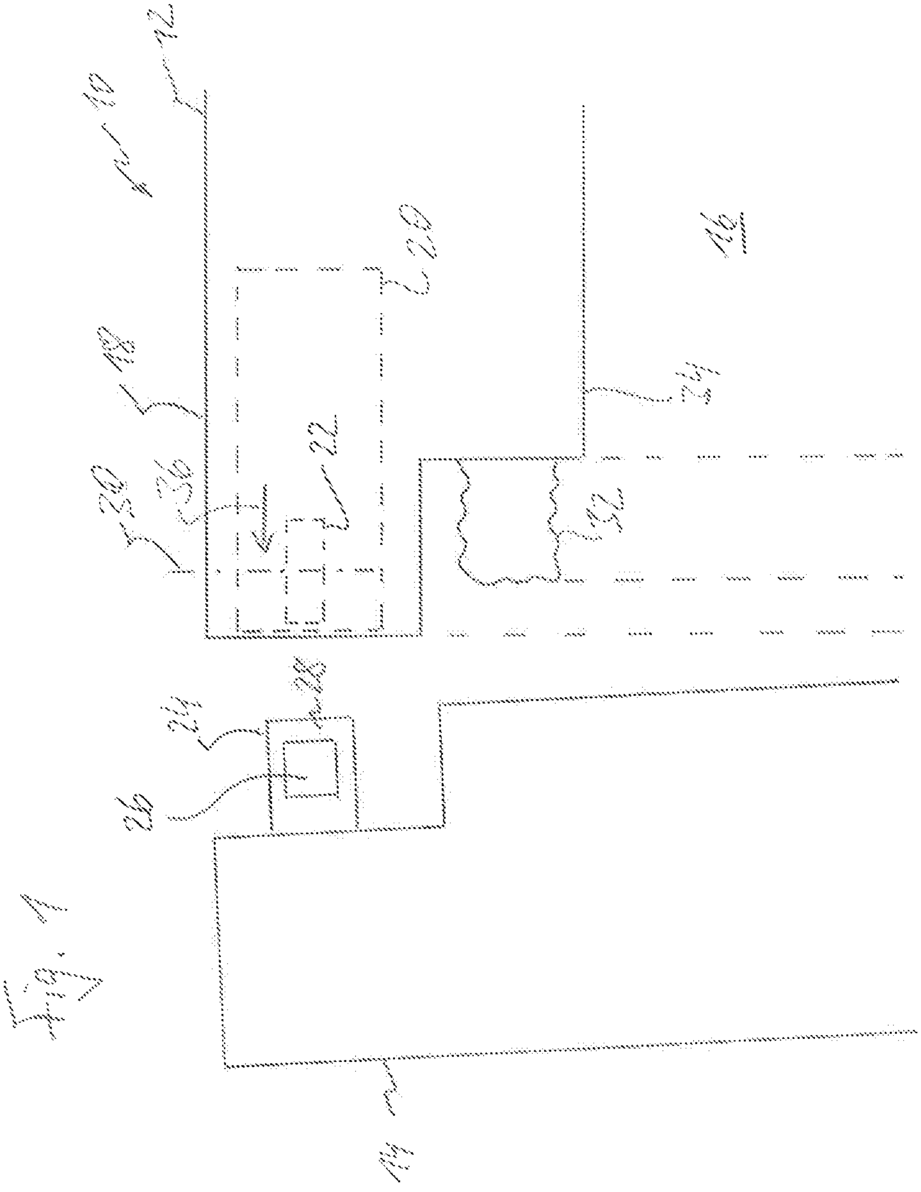
FIG. 1 shows, schematically, a detail of a domestic dishwasher according to an exemplary embodiment.

Reference will first be made to FIG. 1. That fig. shows a detail of a dishwasher 10 intended for use in a private household, having a dishwashing container 12 and a door 14. Of the dishwashing container 12, FIG. 1 shows only the front region of a container roof 18 which delimits a dishwashing chamber 16 at the top and in which there is installed a door latch 20 indicated by a broken line and having a gripper 22 likewise indicated by a broken line. As the door 14 is closed, the gripper 22 cooperates with a closing member 24. In the example shown, the closing member is in the form of a closing shackle and has an aperture 26 which is delimited in the direction of the free end of the closing member 24 by a shackle leg 28. In the closed state of the door latch 20, the gripper 22 engages behind the shackle leg 28 into the aperture 26 and thereby firmly holds the closing member 24. The gripper 22 is rotatable in the container roof 18 about a (non-stationary) axis of rotation 30, and for this reason it can also be referred to as a rotary gripper. In the example shown, the axis of rotation 30 is a vertical axis, that is to say the gripper 22 is arranged for rotation in a horizontal plane. If the available installation space in the container roof 18 permits, it is alternatively possible to accommodate the gripper 22 in the container roof 18 so as to be rotatable about a horizontal axis. In such a case, the closing member 24 is arranged with its shackle leg 28 extending not—as shown in FIG. 1—in the vertical direction (as seen with the door 14 upright), but extending in the horizontal direction. As an alternative to the form of a shackle, the closing member 24 can also have the form of a pin, for example. The door 14 is mounted, in a conventional manner which is therefore not explained in greater detail here, on the dishwashing container 12 in the foot region thereof so as to be pivotable about a horizontal pivot axis.

As the door 14 is closed, it pushes against a door seal 32 which is mounted on a front end face of the dishwashing container 12 and extends at least partly around the dishwashing chamber 16 around an access opening 34 formed in the container front of the dishwashing container 12. The door seal 32 ensures that the dishwashing chamber 16 is sealed with respect to the external environment when the door 14 is closed. When contact is established for the first time between the door 14 and the door seal 32, the resistance which the door seal 32 opposes to its compression is still comparatively low. However, if the door seal 32 is already compressed to a certain degree, the strength of the resistance to further compression typically increases. The force to be applied by the user increases correspondingly. In the case of door latches of the push-push type, this typical compression behavior of the door seal 32 is of particular significance inasmuch as a pushing movement must be exerted on the door 14 (releasing movement) not only to manually close the door latch but also to manually open the door latch. However, when the door 14 is closed, the door seal 32 is generally already comparatively greatly compressed. A manual pushing action by the user when the door 14 is closed, with the aim of opening the latch, can therefore require the application of a comparatively high force by the user.

For this reason, the gripper 22 is displaceable forward from a retracted position in the direction out of the container roof 18 into an advanced position. This forwardly directed horizontal displacement is marked in FIG. 1 by a movement arrow 36. The displaceability of the gripper 22 allows the gripper 22 to move into the advanced position while the door 14 is still open. In that position, the user can close the door 14 with the application of a comparatively low force. In order to establish gripping engagement between the gripper 22 and the closing member 24, only comparatively low—if any—compression of the door seal 32 is required if the gripper 22 has previously been moved forward into its advanced position. Once gripping engagement between the gripper 22 and the closing member 24 has been established, the gripper 22 together with the closing member 24 gripped thereby (and thus together with the door 14 as a whole) can be moved back into the retracted position and thereby close the door 14 fully. The force for the (further) compression of the door seal 32 which thereby takes place does not have to be applied by the user; instead, the door latch 20 contains an actuator (not shown in detail in FIG. 1) which generates the necessary force to move the gripper 22 against the resistance of the door seal 32 into its retracted position.

At the end of a program run of the dishwasher 10, the gripper 22 can be moved forward again by means of the mentioned actuator out of the retracted position into the advanced position, wherein the gripping engagement between the gripper 22 and the closing member 24 is maintained. The operating program of the dishwasher 10 can contain a corresponding program routine which effects an automatic, that is to say program-controlled, forward movement of the gripper 22 into the advanced position at the end of a dishwashing program. Alternatively or additionally, the dishwasher 10 can have a control element, for example in the form of a control button, actuation of which by a control unit of the dishwasher 10 is understood as a command to move the gripper 22 forward into the advanced position.

Once the gripper 22, with the closing member 24 gripped, has been moved forward into the advanced position again, the user can open the door latch 20 with the application of a comparatively low force by a manual pushing action against the door 14.

The described functionality of the door latch 20 of being able to move the gripper 22 into the advanced position in order to allow the user to manually open the door 14 effortlessly does not exclude the possibility that the user can also open the door 14 by a manual pushing action when the gripper 22 is in the retracted position and the door 14 is fully closed. He will then merely have to apply a greater force than in the case of a pushing action when the gripper 22 is in the advanced position. A strong individual may not mind the greater force that is required, but the possibility of manual door opening when the gripper 22 is in the advanced position may be helpful for children or frail, elderly individuals. It is occasionally also desirable in the case of dishwashers to open the door 14 briefly while a dishwashing program is running, for example in order to add additional dishes. The dishwasher 10 can therefore be adapted to interrupt the running of the dishwasher program in response to the inputting of a corresponding command by the user (e.g. in response to the pushing of a corresponding control button) and to move the gripper 22 from the retracted position into the advanced position in order to allow the user to manually open the door effortlessly.

Figure 2A:
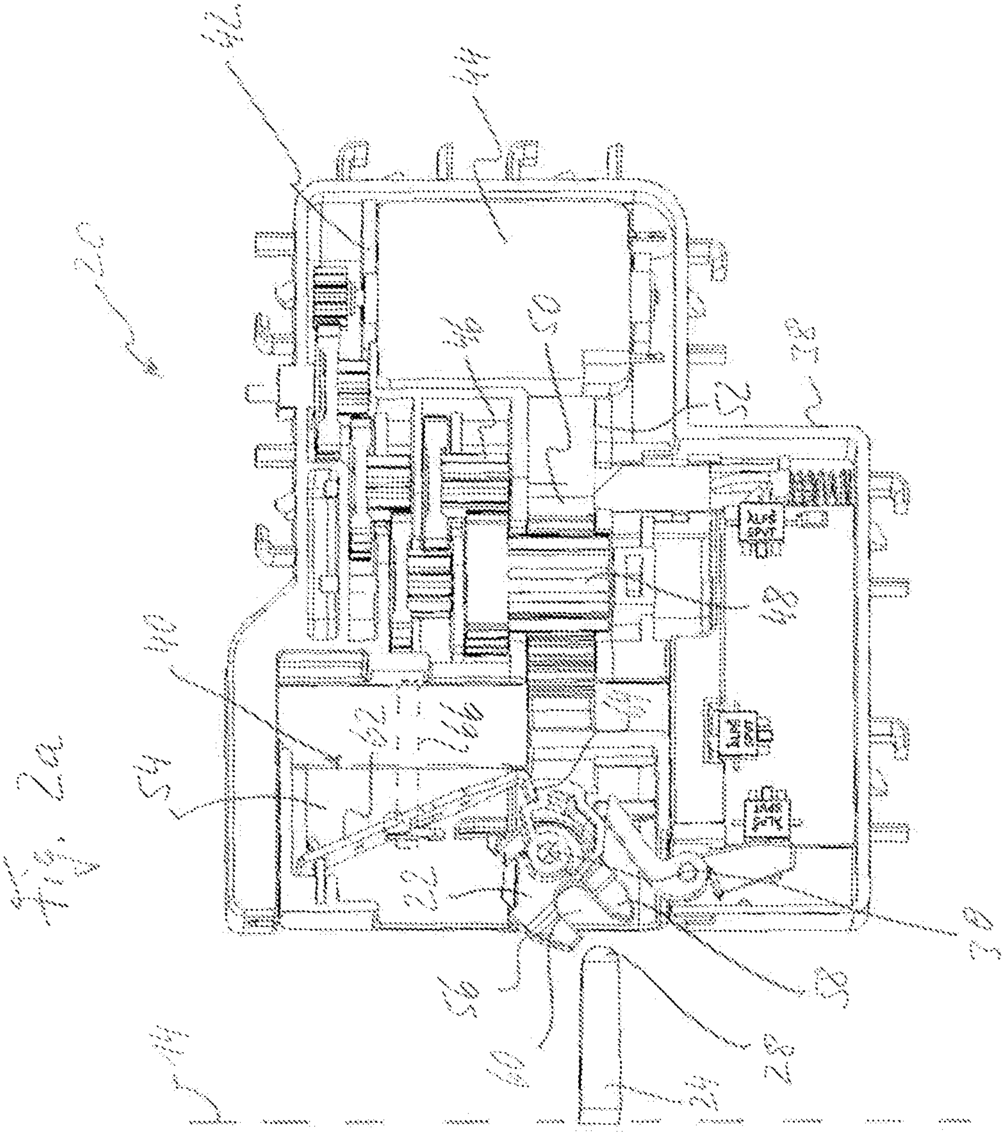
FIG. 2*a* shows an exemplary embodiment of a door latch of the dishwasher of FIG. 1 in an open state of the door latch, wherein a gripper assembly of the door latch is in an advanced position.
Figure 2B:
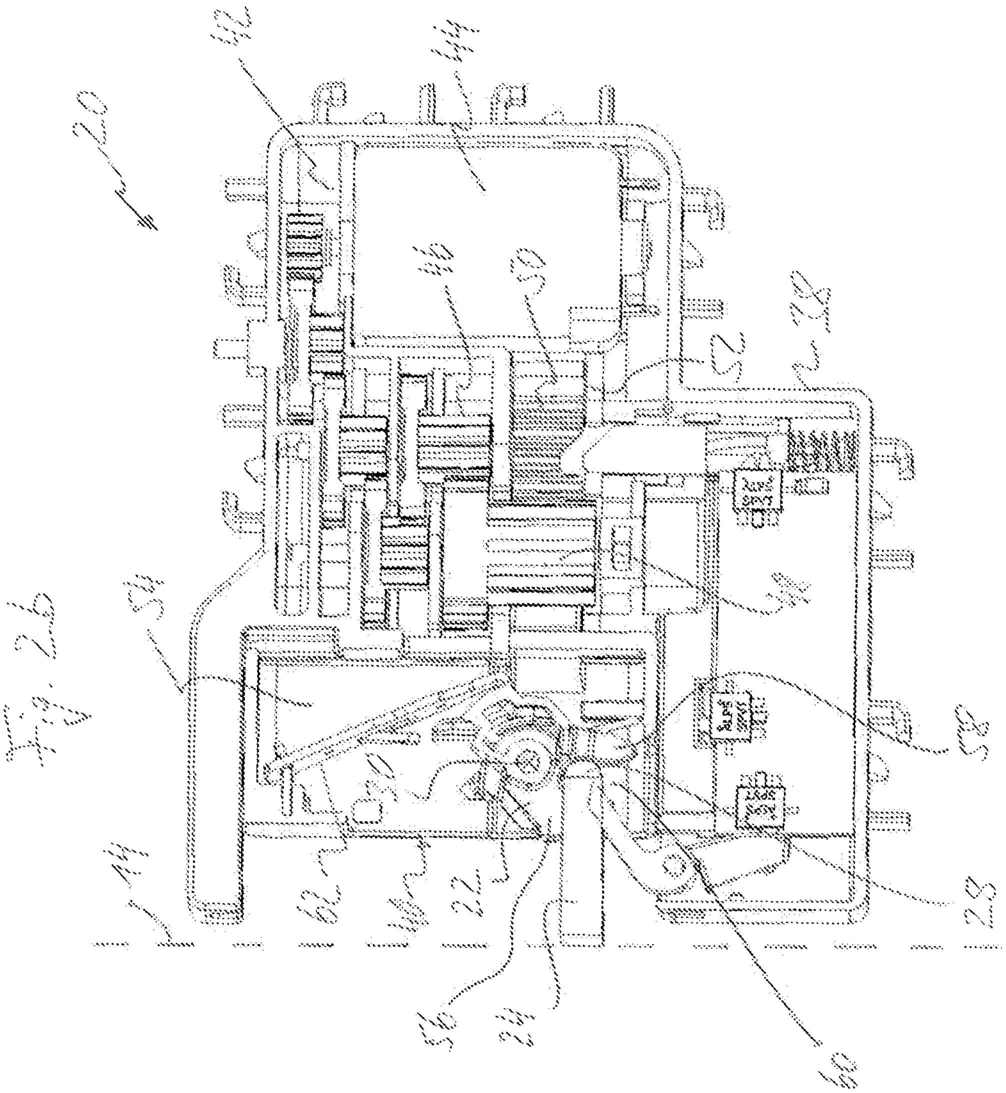
FIG. 2*b* shows the door latch of FIG. 2*a* in a closed state, wherein the gripper assembly is in a retracted position.

For the more detailed explanation of an exemplary embodiment of the door latch 20, reference will now additionally be made to FIGS. 2*a*, 2*b*. The door latch 20 shown therein comprises a latch housing 38 in which a gripper assembly 40 comprising the gripper 22 is accommodated so as to be displaceable between an advanced position shown in FIG. 2*a* and a retracted position shown in FIG. 2*b*. The latch housing 38 is intended to be stationarily installed in the container roof 18 of the dishwashing container 12 and is to that end designed with suitable mounting structures, which are not shown separately in the figures but are readily known to the person skilled in the art. By pushing the gripper assembly 40 forward into the advanced position according to FIG. 2*a*, the gripper 22 can be moved relative to the latch housing 38 in a forward direction (seen from the perspective of a user standing in front of the dishwasher 10). Conversely, by moving the gripper assembly 40 back into the retracted position according to FIG. 2*b*, the gripper 22 can be displaced relative to the latch housing 38 further into the latch housing (i.e. in the direction toward the rear).

For driving the gripper assembly 40, the door latch 20 comprises an electrically controllable displacement mechanism 42, which comprises as the source of drive power an actuator 44 accommodated in the latch housing 38. In the example shown, the actuator 44 is in the form of an electric motor which is in drive connection with the gripper assembly 40 by way of a multi-wheel gear train (reduction gear) 46 which acts in a reducing manner. An output pinion 48 of the gear train 46 is thereby in meshing engagement with a tooth system 50 which is formed on a projection 52 of a gripper carrier 54. The gripper carrier 54 is part of the gripper assembly 40 and serves as the carrier for the gripper 22. The gripper is mounted on the gripper carrier 54 so as to be rotatable about the axis of rotation 30. In the example shown, the gripper carrier 54 is designed as a linear slide which is guided relative to the latch housing 38 so as to be linearly displaceable thereon and is formed, for example, by a plate component; it can also be referred to as a carrier slide.

The gripper 22 has a gripping mouth 60 which is formed by two jaws 56, 58 and in which the shackle leg 28 of the closing member 24 is caught as the door 14 is closed. For this purpose, the gripper 22 is rotatable relative to the gripper carrier 54 between a freeing rotation position (release state) and a gripping rotation position (gripping state). The freeing rotation position is assumed by the gripper 22 when the door latch 20 is open (i.e. generally when the door 14 is open); it is shown in FIG. 2*a*. If, in this state, the door 14 is moved toward the door latch 20, the shackle leg 28 strikes the jaw 58 of the gripper 22 and thereby initiates a rotation of the gripper 22. In the course of this rotation, the jaw 56 of the gripper moves into the aperture 26 of the closing member 14 and thereby engages behind the shackle leg 28. The shackle leg is thereby caught in the gripping mouth 60; this represents the closed state of the door latch 20. The resulting gripping rotation position of the gripper 22 is shown in FIG. 2*b*. While the gripper 22 is in the gripping rotation position and holds the closing member 24 captive, the gripper assembly 40 can be moved to and fro between the advanced position according to FIG. 2*a* and the retracted position according to FIG. 2*b* by actuation of the actuator 42. It is likewise possible to displace the gripper assembly 40 between the advanced position and the retracted position while the gripper 22 is in the freeing rotation position according to FIG. 2*a*. Displacement of the gripper assembly 40 between the advanced position and the retracted position consequently has no direct effect on the rotation position of the gripper 22; the gripper assumes the same rotation position at the end of the displacement (freeing rotation position or gripping rotation position) as it assumed at the start of the displacement. If the door latch 20 is closed at the start of the displacement of the gripper assembly 40, it is also closed at the end of the displacement. In particular: If the door latch 20 is closed at the start of a displacement of the gripper assembly 40 from the retracted position into the advanced position, the door latch 20 is still closed even when it reaches the advanced position.

The door latch 20, as explained, is a latch of the push-push type, that is to say the user can close the door latch 20 by manually pushing against the door 14 (first pushing action or closing pushing action) and can then open the door latch 20 again by manually pushing against the door 14 again (second pushing action or releasing pushing action). Pushing against the door 14 again in this way corresponds to a movement of the closing member 24 in the closing direction of the door 14, that is to say further into the door latch 20. It causes a rotation movement of the gripper 22 beyond the gripping rotation position according to FIG. 2*b*. The gripping rotation position of the gripper 22 according to FIG. 2*b* is accordingly not an end rotation position; instead, the gripper 22 can be rotated from the freeing rotation position according to FIG. 2*a* beyond the gripping rotation position according to FIG. 2*b* into a release rotation position. The second pushing action causes a locking element (latch) 62, which is part of the gripper assembly 40 and is pivotably mounted on the gripper carrier 54, to lose locking engagement with the gripper 22. The locking element 62 moves into locking engagement as a result of the first pushing action. The locking engagement blocks the gripper 22 against rotation back from the gripping rotation position into the freeing rotation position. Loss of the locking engagement, when the gripper 22, starting from the closed state of the door latch 20, is rotated by the second pushing action from the gripping rotation position into the release rotation position, removes the blocking of the gripper 22 against rotating back into the freeing rotation position. A biasing spring (not shown in detail in the figures) acting on the gripper 22 biases the gripper 22 in the direction toward the freeing rotation position and assists the rotation of the gripper 22 from the release rotation position back into the freeing rotation position. The cumulative restoring force of the mentioned biasing spring and of the door seal 32 can be sufficient to push the door 14 open slightly. A certain manual pull on the door 14 by the user may additionally be required.

In the example shown, the locking element 62 is in the form of a one-armed locking lever which in the region of one of its lever ends is mounted in an articulated manner on the gripper carrier 54 and in the region of its other lever end has an engagement lug 64 which is biased by a further biasing spring (not shown in detail in the figures) into abutment on a radial circumferential surface of the gripper 22. The engagement lug 64 accordingly slides along the circumferential surface of the gripper 22 when the gripper moves between the freeing rotation position and the gripping rotation position and between the gripping rotation position and the release rotation position. There are thereby formed on the circumferential surface of the gripper 22 structures which define a path along which the engagement lug 64 moves during a manual closing and opening operation of the door latch 20. These structures comprise, inter alia, a radial step (not shown in detail) formed on the circumferential surface of the gripper 22, on which the engagement lug 64 of the locking element 62 hooks in the closed state of the door latch 20 and thus blocks the gripper 22 against rotation back into the freeing rotation position. The mentioned structures are additionally so shaped that, during the second pushing action of the user or/and during the subsequent rotation back of the gripper 22, they guide (deflect) the locking element 62 in such a way that the engagement lug 64 moves past the mentioned radial shoulder during the rotation back. The gripper 22 can thus return to the freeing rotation position and is not stopped in the gripping rotation position by the locking element 62 during the rotation back. This guiding function of the mentioned structures can be assisted by the action of the mentioned biasing spring of the locking element 62.

For further details of an exemplary configuration of the radial circumferential surface of the gripper 22, in order to define a control path for the engagement lug 64 of the locking element 62 that ensures the mentioned push-push functionality of the door latch 20, reference may be made, for example, to DE 39 19 458 A1. The content of this DE publication is hereby incorporated by reference in its entirety in the present disclosure.

The possibility of manually opening the door latch by the second pushing action exists, in the case of the door latch 20 of FIGS. 2*a*, 2*b*, both in the advanced position of the gripper assembly 40 according to FIG. 2*a* and in the retracted position according to FIG. 2*b*. Suppression of the possibility of manual opening when the door 14 is fully closed corresponding to the situation shown in FIG. 2*b* is not provided in the described exemplary embodiment of the door latch 20. This is because, in the case of dishwashers, it is generally desirable to be able to open the door 14 at any time even during dishwashing operation, for example in order to add further dishes. A door latch of the push-push type in which the possibility of manual opening is suppressed when the door 14 is fully closed will be described below with reference to the further figures. Before that, an automatic opening function of the door latch 20 of FIGS. 2*a*, 2*b* is to be explained.

When a dishwashing program has ended, it can be desirable that the door 14 automatically opens slightly in order to allow hot steam to escape from the dishwashing chamber 16 and accelerate the process of drying the dishes therein. For automatic opening of the door latch 20, the gripper assembly 40, starting from the retracted position according to FIG. 2*b*, can be moved forward by means of the displacement mechanism 42 beyond the advanced position according to FIG. 2*a* into an open position (not shown in detail in the figures). As the gripper assembly 40 is advanced from the advanced position according to FIG. 2*a* into the mentioned open position, the locking element 62 strikes a lifting element, shown by a broken line at 66, which is arranged stationarily relative to the latch housing 38, for example is fixedly connected thereto, and causes the locking element 62 to be lifted out of abutting contact with the circumferential surface of the gripper 22. The result of the lifting is that the engagement lug 64 of the locking element 62 moves out of the movement range of the radial step formed on the circumferential surface of the gripper 22 and the locking element 62 can thus no longer block the gripper 22 against rotation back from the gripping rotation position into the freeing rotation position. Consequently, lifting of the locking element 62 leads to a change of the door latch 20 from the closed state into the open state, with the result that the door 14 is no longer held closed by the door latch 20. Once automatic opening has taken place, a control unit of the dishwasher 10 that controls the displacement mechanism 42 can move the gripper assembly 40 from the open position back into the advanced position according to FIG. 2*a* again. The door latch 20 is then ready for manual closing of the door 14 again.

By contrast, a displacement of the gripper assembly 40 between the advanced position and the retracted position has no effect on the existence of the locking engagement between the locking element 62 and the gripper 22 if the door latch 20 is closed at the start of the displacement. Because the locking element 62 moves together with the gripper 22 and the gripper carrier 54 during such a displacement of the gripper assembly 40, the gripping state of the gripper 22 remains unaffected. Only if the locking element 62 strikes the lifting element 66 during the displacement of the gripper assembly 40 from the advanced position into the mentioned open position does the gripper 22 change from the gripping state into the release state. The different positions of the gripper assembly 40 (retracted position, advanced position, open position) can be detectable by suitable sensors (e.g. mechanically actuatable switches) of the door latch 20. The control unit of the dishwasher 10 can control the operation of the actuator 44 on the basis of the signals of such sensors.

Figure 3:
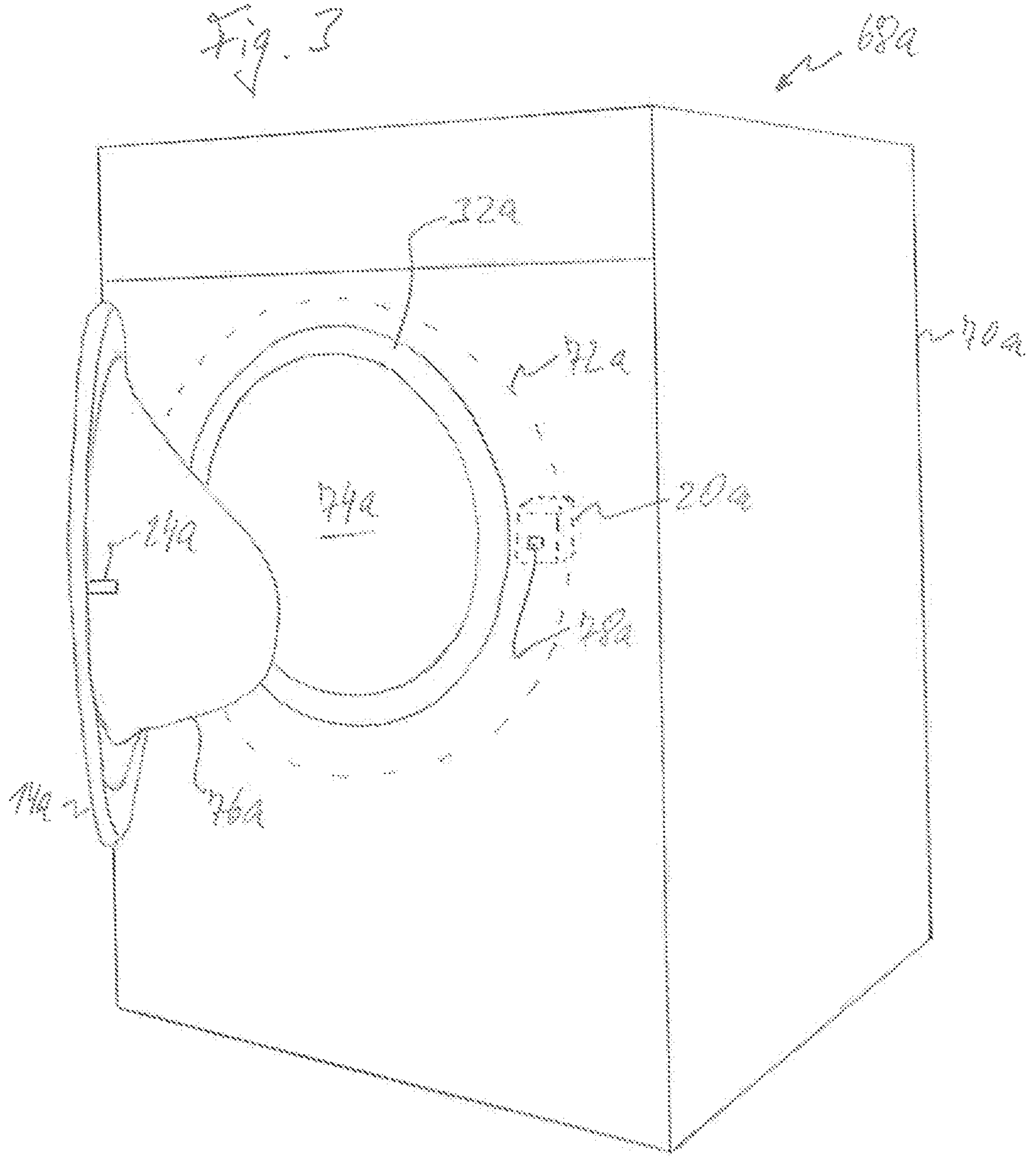
FIG. 3 shows, schematically and in perspective, an exemplary embodiment of a domestic washing machine.

The invention can be used not only in a door latch of a dishwasher, but also in a door latch for other types of domestic appliance. An exemplary embodiment of a door latch which can be used in a domestic washing machine or washer-dryer (i.e. an appliance with a combined washing and drying function for laundry) is to be explained hereinbelow. In such types of machine, it is generally desirable, for safety reasons, to secure the door of the machine against manual opening while a washing program is running. Accordingly, the door latch is to provide a function not only for holding the door closed, but also for locking the door. Therefore, in FIGS. 4 to 7*b*, an exemplary embodiment of a push-push door latch with a locking function is shown, wherein FIG. 3 shows a front-loader washing machine as an exemplary embodiment of a laundry treatment appliance in which the door latch of FIGS. 4 to 7*b* can be used. In FIGS. 3 to 7*b*, elements that are the same or that have the same effect are provided with the same reference numerals as in the preceding figures, but with the addition of a lowercase letter. Unless indicated otherwise hereinbelow, reference is made to the preceding comments relating to FIGS. 1 to 2*b* for the explanation of such elements that are the same or that have the same effect.

The front-loader washing machine—designated 68*a*—shown in FIG. 3 comprises a machine body 70*a* in which a washing drum 72*a*, indicated by a broken line, is rotatably accommodated. The interior of the washing drum 72*a* is accessible through an access opening 74*a* formed on the front side of the washing machine 68*a*, in order to load and unload the washing drum 72*a* with items of laundry. A door seal 32*a* extends on the machine body 70*a* around the access opening 74*a*, which door seal is compressed as a bullseye door 14*a*, designed with a viewing window 76*a*, of the washing machine 68*a* is closed and thereby seals the washing chamber of the washing machine 68*a* with respect to the external environment. For holding the door 14*a* closed, the washing machine 68*a* has a door latch 20*a* which in the example shown is mounted on the machine body 70*a* and which has an insertion opening 78*a* for a closing member 24*a* arranged on the door 14*a*. Details of an exemplary embodiment of the door latch 20*a* will be explained hereinbelow with reference to FIGS. 4 to 7*b*.

The door latch 20*a* of the exemplary embodiment of FIGS. 4 to 7*b* is—like the door latch 20 of FIGS. 2*a*, 2*b*—of the push-push type and comprises a gripper assembly 40*a*, the gripper carrier 54*a* of which is here not in the form of a linear slide but in the form of a carrier lever mounted on the latch housing 38*a* so as to be pivotable about a pivot axis 80*a*. A gripper 22*a* and a locking element 62*a* are movably mounted on this carrier lever 54*a*; the form of the gripper 22*a* and of the locking element 62*a* corresponds to that of the gripper 22 and of the locking element 62 of the exemplary embodiment of FIGS. 2*a*, 2*b*. The carrier lever 54*a*, together with the gripper 22*a* and the locking element 62*a*, is pivotable relative to the latch housing 38*a* between an advanced position and a retracted position, wherein a biasing spring 82*a*, which is supported between the carrier lever 54*a* and the latch housing 38*a* and in the example shown is in the form of a helical compression spring, biases the carrier lever 54*a* in the direction toward the retracted position. This means that the displacement mechanism 42*a*, by means of which the gripper assembly 40*a* is displaceable between the advanced position and the retracted position, must work against the force of the biasing spring 82*a* in order to displace the gripper assembly 40*a* from the retracted position in the direction toward the advanced position. Conversely, the biasing spring 82*a* assists the displacement mechanism 42*a* when the displacement mechanism is activated so as to displace the gripper assembly 40*a* from the advanced position into the retracted position. The gripper assembly 40*a* is in the retracted position in FIGS. 5*a* and 6 and is in the advanced position in FIGS. 4, 5*b*, 7*a* and 7*b*.

Unlike in the exemplary embodiment of FIGS. 2*a*, 2*b*, the displacement mechanism 42*a* is not in direct meshing engagement with the gripper assembly 40*a*. Instead, the displacement mechanism 42*a* comprises a control member 84*a* having a plurality of functions. As a first function, the control member 84*a* serves to control the position of the carrier lever 54*a* and thus of the gripper assembly 40*a* as a whole. As a second function, the control member 84*a* serves to lock the door latch 20*a* in the closed state. Locking ensures that the door latch 20*a* cannot be opened by the user by a second pushing action. As a third function, the control member 84*a* serves to automatically open the door latch 20*a*. In the example shown, the control member 84*a* is in the form of a control slide which is guided in a linearly movable manner relative to the latch housing 38*a* and is adjustable between a first control position shown in FIG. 6, a second control position shown in FIGS. 4 and 5*b*, and a third control position shown in FIGS. 7*a*, 7*b*. In the example shown, the direction of the movability of the control member 84*a* is perpendicular to the axis of rotation 28*a* of the gripper 22*a* and thus parallel to the rotation plane of the gripper 22*a*. The control member 84*a* has a tooth system 86*a* with which the output pinion 48*a* of the reduction gear 46*a* of the displacement mechanism 42*a* is in meshing engagement. By actuation of the actuator 44*a*, the control member 84*a* can accordingly be moved to and fro (according to the drive direction of the actuator 44*a*) and adjusted into the mentioned control positions. Suitable sensors can again be present in the door latch 20*a* in order to detect the control positions of the control member 84*a* and signal them to a control unit (not shown in detail in the figures) of the washing machine 68*a* that controls the operation of the actuator 44*a*.

On the control member 84*a* there is formed a control path 88*a* on which a pin 90*a* protruding from the carrier lever 54*a* and serving as a path follower slides when the control member 84*a* is displaced between its control positions. The force of the biasing spring 82*a* ensures that the pin 90*a* is biased in abutment on the control path 88*a*. The control path 88*a* has a ramp section 92*a* which extends at an angle to the movement direction, indicated by a double arrow 94*a*, of the control member 84*a* and serves to transfer the gripper assembly 40*a* between the advanced position and the retracted position. The end of the ramp section 92*a* on the right in FIGS. 5*b*, 6, 7*a* defines the retracted position of the gripper assembly 40*a*, while the end of the ramp section 92*a* on the left in the mentioned figures defines the advanced position of the gripper assembly 40*a*. If the control member 84*a* is moved from the first control position according to FIG. 6 relative to the gripper assembly 40*a* in the direction to the right into the second control position, the abutting contact of the pin 90*a* with the ramp section 92*a* of the control path 88*a* causes the carrier lever 54*a* and thus the gripper assembly 40*a* to pivot about the pivot axis 80*a* into the advanced position; this situation is shown in FIG. 5*b* (FIG. 4 also shows the control member 84*a* in its second control position).

Figure 5A:
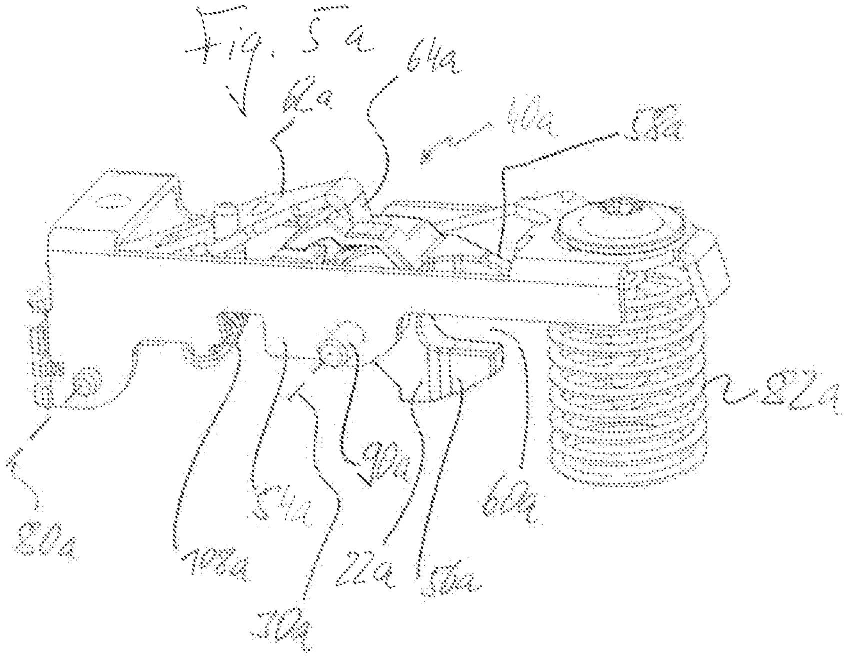
FIG. 5*a* is a perspective view of the gripper assembly of the door latch of FIG. 4 in a rest state with the door latch closed.
Figure 5B:
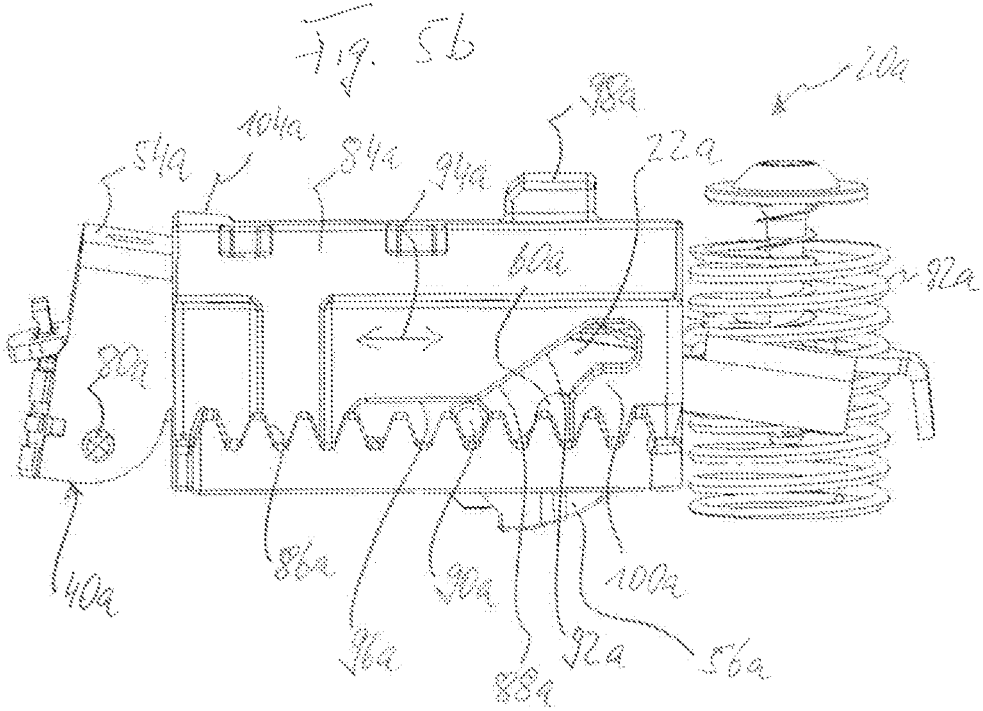
FIG. 5*b* shows the gripper assembly of FIG. 5*a* together with a control slide of the door latch of FIG. 4 in the latch state corresponding to FIG. 4.
Figure 6:
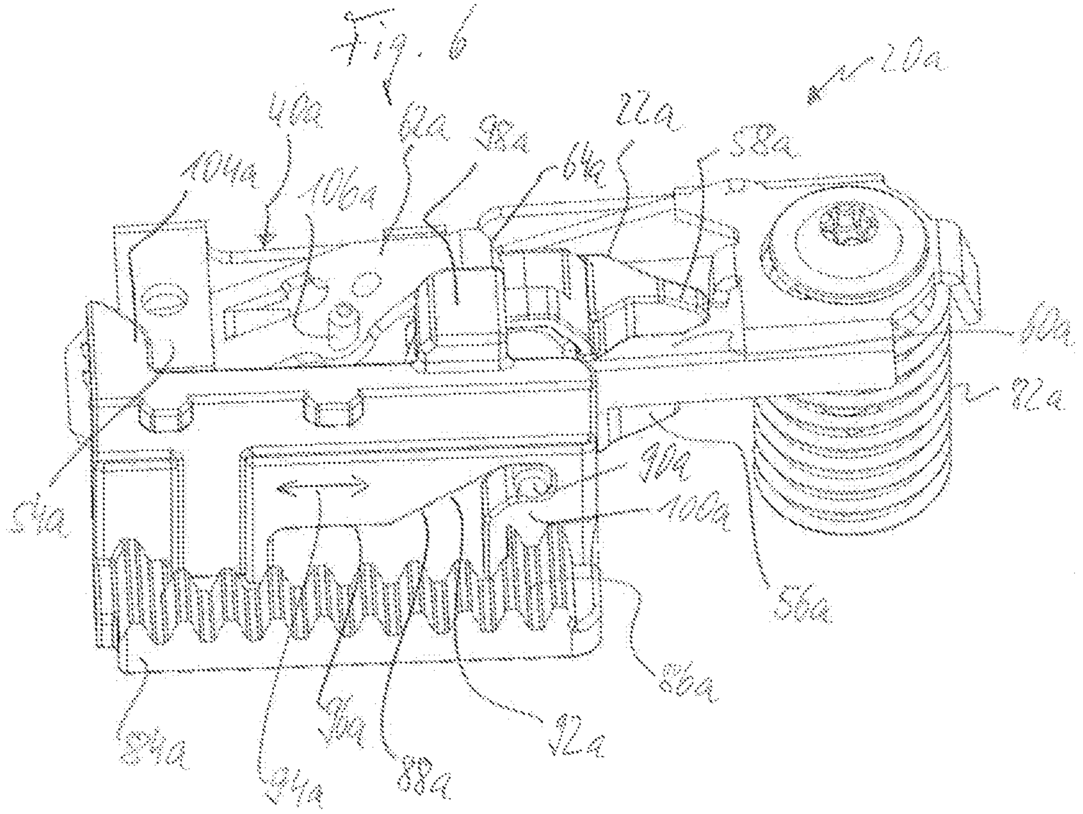
FIG. 6 shows the control slide and the gripper assembly of the door latch of FIG. 4 in a closed and locked state of the door latch, wherein the gripper assembly is in a retracted position.
Figure 7A:
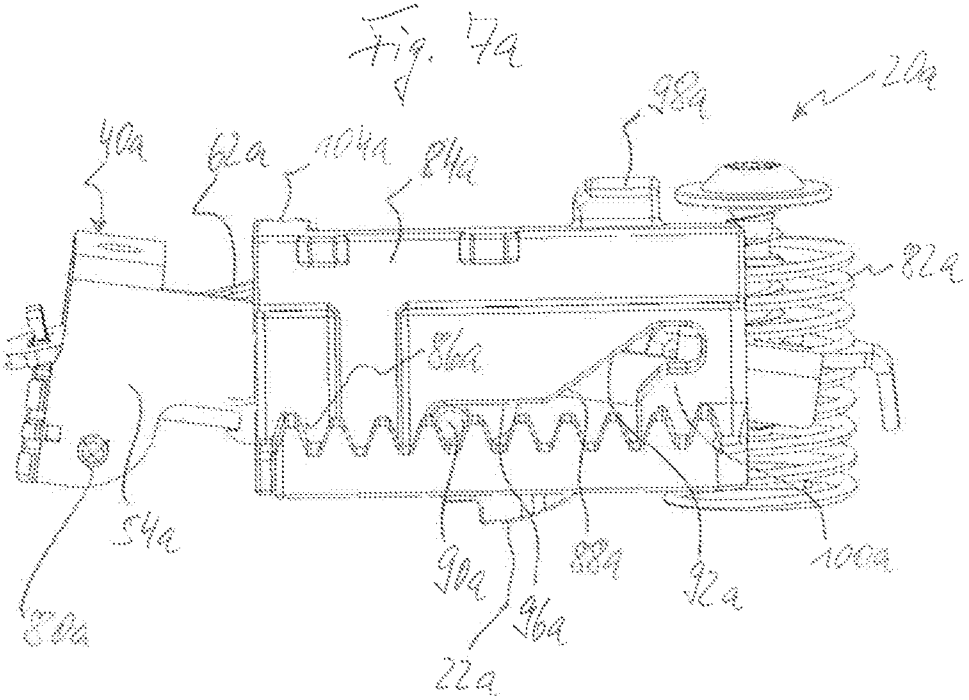
FIGS. 7*a* and 7*b* are two different views of the control slide and the gripper assembly of the door latch of FIG. 4 in an open state of the door latch.

The control path 88*a* continues at the end of the ramp section 92*a* on the left in FIGS. 5*b*, 6, 7*a* (which defines the second control position of the control member 84*a*) with a path section 96*a* which extends substantially linearly and parallel to the movement direction 94*a*. This path section 96*a* allows the control member 84*a* to be transferred from the second control position according to FIG. 5*b* into the third control position according to FIGS. 7*a*, 7*b*. Because of the mentioned orientation of the path section 96*a* substantially parallel to the movement direction 94*a*, a movement of the control member 84*a* between the second and the third control position is not accompanied by pivoting, or at least not by substantial pivoting, of the carrier lever 54*a*. The pivot position of the carrier lever 54*a* and thus of the gripper assembly 40*a* in the third control position of the control member 84*a* consequently corresponds substantially to the pivot position in the second control position. In other embodiments, however, it is conceivable that the path section 96*a* has a profile other than linearly parallel to the movement direction 94*a*, so that a certain pivoting displacement of the gripper assembly 40*a* (e.g. into an even more advanced position) can also occur on adjustment of the control member 84*a* between the second and the third control position.

Figure 4:
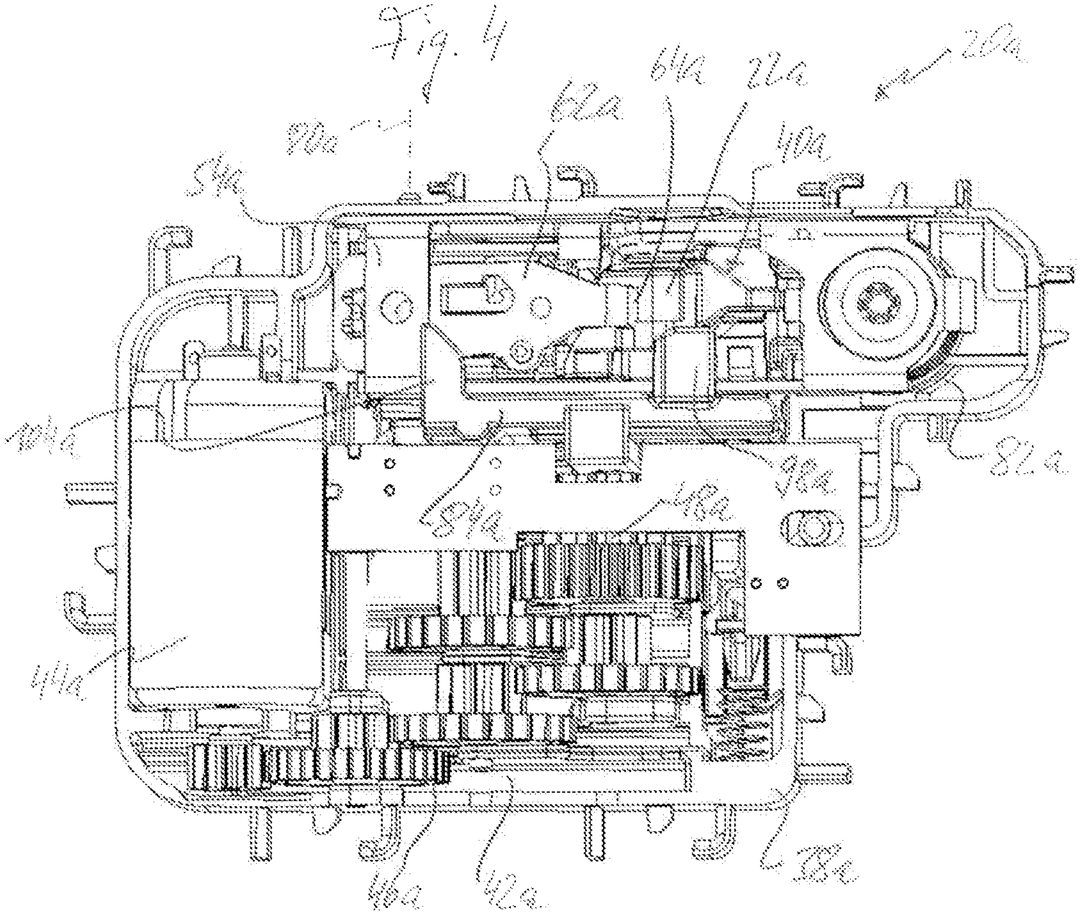
FIG. 4 shows an exemplary embodiment of a door latch of the washing machine of FIG. 3 in a closed but still unlocked state of the door latch, wherein a gripper assembly of the door latch is in an advanced position.

In the second control position of the control member 84*a* according to FIGS. 4 and 5*b*, the gripper assembly 40*a* has been adjusted into the advanced position, wherein the door latch 20*a* in this situation can be manually closed and opened again by the user by a double pushing action (first pushing action for closing the door latch 20*a*, second pushing action for opening it). Because of the advanced position of the gripper assembly 40*a*, this manual closing and opening of the door latch 20*a*—analogously to the exemplary embodiment of FIGS. 2*a*, 2*b*—is possible with comparatively low compression (if any) of the door seal 32*a* and consequently with a comparatively low application of force by the user. FIG. 5*b* shows the gripper 22*a* in its gripping rotation position, in which it is blocked by the locking element 62*a* against rotation into the freeing rotation position. As in the exemplary embodiment of FIGS. 2*a*, 2*b*, the locking engagement between the locking element 62*a* and the gripper 22*a* can be overcome by the second pushing action, so that the gripper 22*a* is able to rotate relative to the carrier lever 54*a* into the freeing rotation position (this freeing rotation position is not shown in FIGS. 4 to 7*b*; however, it corresponds to the situation shown in FIG. 2*a*).

During washing operation of the washing machine 68*a*, the door latch 20*a* should be locked, that is to say it should not be possible for the user to manually open the door latch 20*a*. In the exemplary embodiment shown, blocking formations 98*a*, 100*a* are for this purpose formed on the control member 84*a*, which blocking formations become active in the sense of locking the door latch 20*a* when the control member 84*a* is moved from the second control position according to FIGS. 4, 5*b* into the first control position according to FIG. 6. The blocking formation 98*a* prevents the gripper 22*a* from being rotated back from the gripping rotation position into the freeing rotation position in the first control position of the control member 84*a* in the closed state of the door latch 20*a*. The blocking formation 98*a* is configured and arranged in such a way that, in the first control position of the control member 84*a*, when the door latch 20*a* is closed, the engagement lug 64*a* of the locking element 62*a* always comes into abutting contact with the radial step 102*a* again when a second pushing action is performed by the user. Therefore, the locking engagement between the locking element 62*a* and the gripper 22*a* cannot be manually released by the user. For this purpose, in the example shown, the blocking formation 98*a* prevents lateral pivoting of the locking element 62*a* on the circumferential surface of the gripper 22*a*; the blocking formation 98*a* in this respect forms a stop which is moved into the pivot path of the locking element 62*a* in the first control position of the first control member 84*a* and is moved out of the pivot path of the locking element 62*a* in the second control position of the control member 84*a*.

It is conceivable that there is additionally formed on the control member 84*a* a blocking formation which is moved into the rotation path of the gripper 22*a* in the first control position of the control member 84*a* and, by directly blocking the gripper 22*a*, blocks the gripper against rotation from the gripping rotation position into the freeing rotation position. On transfer of the control member 84*a* from the first control position into the second control position, such an additional blocking formation would be moved out of the rotation path of the gripper 22*a* and thereby remove the blocking of the gripper 22*a*.

The blocking formation 100*a* is moved beneath the pin 90*a* in the first control position of the control member 84*a* and thereby blocks the gripper assembly 40*a* against pivoting from the retracted position into the advanced position. This prevents pulling on the door 14*a* by the user during running washing operation of the washing machine 68*a* from leading to at least partial decompression of the door seal 32*a* and thus possibly to the escape of hot washing liquor from the washing chamber of the washing machine 68*a*.

It is possible that the configuration of the control member 84*a* with blocking formations which additionally lock the closed door latch 20*a* in the retracted position of the gripper assembly 40*a* (such as e.g. the blocking formations 98*a*, 100*a*) results in the control member 84*a* being able to be moved from the second control position according to FIGS. 4, 5*b* into the first control position according to FIG. 6 only after the door latch 20*a* has been closed and the gripper 22*a* has accordingly been brought into its gripping rotation position. In such embodiments, manual closing of the door latch 20*a* would be possible only in the advanced position of the gripper assembly 40*a*, but not in the retracted position of the gripper assembly 40*a*. It is, however, not excluded to configure the blocking formations of the control member 84*a* in such a way that the gripper assembly 40*a* can be transferred into the retracted position according to FIG. 6 also in the open state of the door latch 20*a* (i.e. when the gripper 22*a* is in the freeing rotation position). In such embodiments, it would then be possible to manually close the door latch 20*a* also in the retracted position of the gripper assembly 40*a*. The door latch 20*a* could then be manually closed and opened again in the second control position of the control member 84*a*, in the first control position of the control member 84*a* it could be manually closed, wherein it would then at the same time be locked and therefore could not be opened manually. In any case, the closed state of the door latch 20*a* is maintained when the control member 84*a*, with the door latch 20*a* closed, is moved from the first control position according to FIG. 6 into the second control position according to FIGS. 4, 5*b*.

Figure 7B:
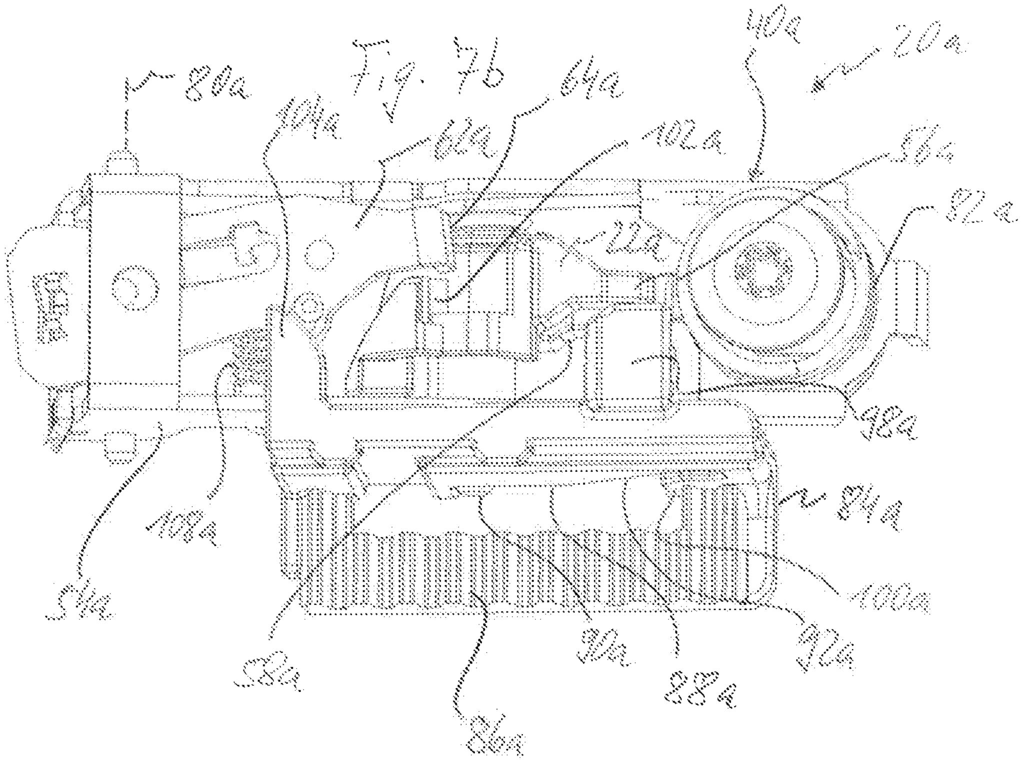

The third control position of the control member 84*a* serves, as mentioned, for automatically opening the door latch 20*a*. When seen from the first control position, it is located beyond the second control position of the control member 84*a*. If the control member 84*a*, starting from the second control position, is moved into the third control position, a release formation 104*a* formed on the control member 84*a* comes into effect by striking against the locking element 62*a* (in the example shown, against a pin-like projection 106*a* formed on the locking element 62*a*) and thereby urging the locking element 62*a* laterally away from the radial step 102*a*. The gripper 22*a* is thereby freed for rotation back into the freeing rotation position. FIG. 7*b* shows the situation in which the locking element 62*a* has been urged out of the effective range of the radial step 102*a*. This urging takes place against the action of a spring 108*a* which biases the engagement lug 64*a* of the locking element 62*a* on the one hand into abutting contact with the circumferential surface of the gripper 22*a* and on the other hand in the lateral direction, that is to say in the direction toward the axis of rotation 28*a* of the gripper 22*a*. If the door latch 20*a* is in the closed state in the second control position of the control member 84*a*, the door latch 20*a* can thus be opened in an automated manner without a second pushing action by the user by movement of the control member 84*a* into the third control position according to FIGS. 7*a*, 7*b*.

The pin 90*a* of the gripper assembly 40*a* that is guided on the control path 88*a* does not have to be formed by or on the carrier lever 54*a*. Instead, it is conceivable that the pin 90*a* is part of a bearing pin by means of which the gripper 22*a* is rotatably mounted on the carrier lever 54*a* and which is pushed through a corresponding bearing hole in the carrier lever 54*a*.

Figure 8A:
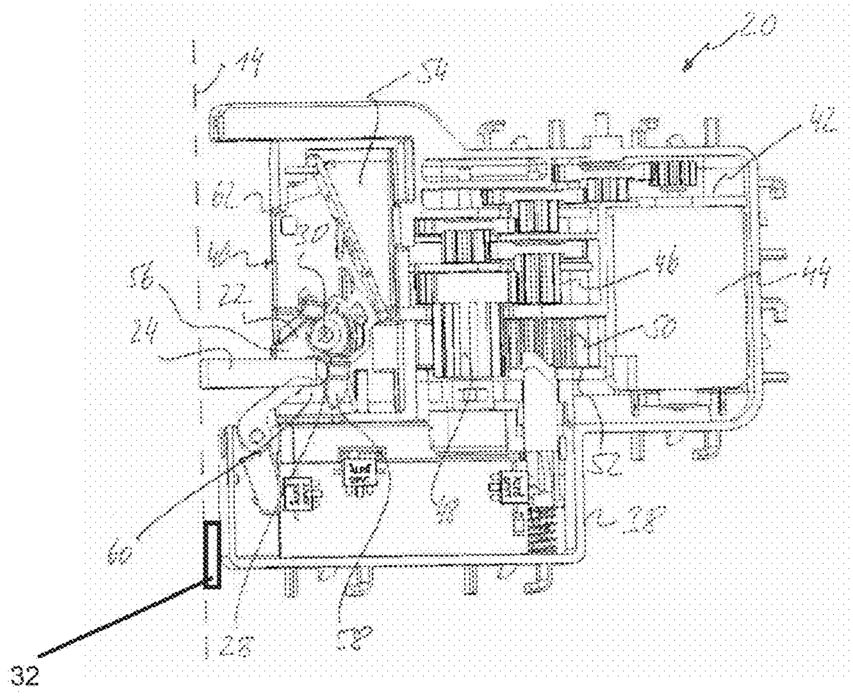
FIGS. 8*a* and 8*b* are two different views illustrating compression states of a door seal.
Figure 8B:
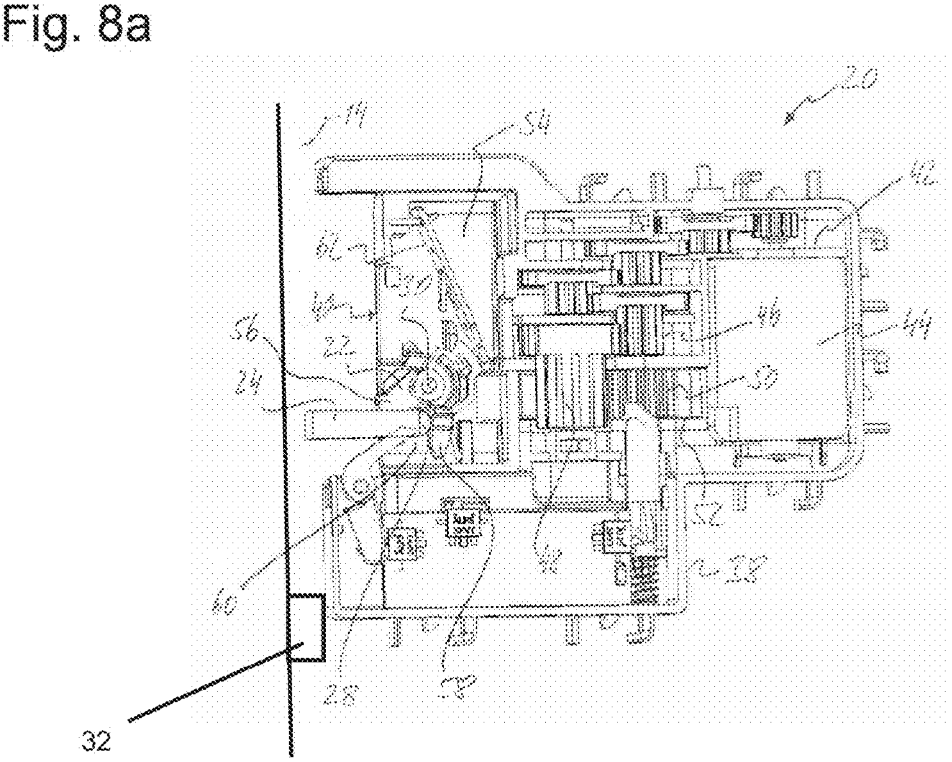

FIGS. 8*a* and 8*b* are two different views illustrating compression states of door seal 32.

The invention claimed is:

1. A door latch of a push-push operational configuration for a domestic electrical appliance, the door latch comprising:

a gripper arranged to be adjustable between a gripping state and a release state, wherein the gripper is configured to grip, in the gripping state, a closing member for holding a door of the domestic electrical appliance closed, the closing member moving relatively closer to the gripper in a closing direction as the door of the domestic electrical appliance is closed, wherein the gripper is configured to permit, in the release state, the closing member to be released for opening the door, wherein, when the door is closed, the gripping state of the gripper can be released by a relative releasing movement of the closing member which is carried out in the closing direction; and an electrically controllable displacement mechanism for displacing the gripper, under electrical control, from a retracted position into an advanced position which, when the closing member is gripped, corresponds to a state in which the door is closed to a relatively lesser degree than in the retracted position;

wherein the door latch comprises a latch housing in which a gripper assembly comprising the gripper is accommodated, wherein by pushing the gripper forward into the advanced position the gripper moves relative to the latch housing in a forward direction and by moving the gripper into the retracted position, the gripper is displaced relative to the latch housing further into the latch housing;

wherein the displacement mechanism comprises an electromotive actuator which is in drive connection with the gripper assembly or is in in drive connection with a control member, wherein the control member is adjustable by activation of the electromotive actuator into different control positions, of which a first control position corresponds to the retracted position of the gripper and a second control position corresponds to the advanced position of the gripper; and wherein the control member is designed with at least one blocking formation, which in the first control position is able to effect blocking of the gripper against transfer from the gripping state into the release state and in the second control position allows the gripper to be transferred from the gripping state into the release state.

2. The door latch as claimed in claim 1, wherein the door latch has at least one of the following:

in the advanced position of the gripper, when the closing member is gripped, the door latch allows the gripping state of the gripper to be released by carrying out the releasing movement of the closing member;

the door latch allows a displacement, effected by means of the displacement mechanism, of the gripper from the retracted position into the advanced position while the closing member is gripped by the gripper;

the door latch allows a displacement, effected or at least assisted by the displacement mechanism, of the gripper from the advanced position into the retracted position, in particular while the closing member is gripped by the gripper; and in the advanced position of the gripper, when the closing member is gripped, the displacement mechanism is adapted for electrically controlled release of the gripping state of the gripper.

3. The door latch as claimed in claim 2, wherein a displacement, effected or at least assisted by the displacement mechanism, of the gripper from the advanced position into the retracted position causes a blocking formation for preventing the gripper from being rotated back from a gripping rotating position into a freeing position to become active in the sense of blocking the gripper against transfer into the release state.

4. The door latch as claimed in claim 1, wherein the displacement mechanism further comprises the control member, which is in drive connection with the electromotive actuator, for controlling the position of the gripper.

5. The door latch as claimed in claim 4, wherein the control member is adjustable into a third control position which, when seen from the first control position, is located beyond the second control position and, when the control member is moved from the second control position into the third control position, is able to operate a release formation arranged on the control member in the sense of releasing the gripping state of the gripper.

6. The door latch as claimed in claim 4, wherein the displacement mechanism comprises a gear train arranged in the force transmission path between the actuator and the control member, and the control member has a tooth system for meshing with an output wheel of the gear train.

7. The door latch as claimed in claim 1, wherein the at least one blocking formation comprises a blocking formation for direct blocking cooperation with the gripper or/and a blocking formation for indirect blocking cooperation with the gripper.

8. The door latch as claimed in claim 1, further comprising the gripper assembly which comprises a movably arranged carrier in mechanical drive coupling with the displacement mechanism, wherein the gripper is mounted on the carrier so as to be adjustable relative thereto between the gripping state and the release state, wherein there is additionally mounted on the carrier a locking element which is movable relative to the gripper and which secures the gripper in the gripping state thereof against movement into the release state, wherein the gripper assembly is displaceable as a unit between the advanced position and the retracted position without changing the state of the gripper, that is to say the gripping state or the release state, during or as a result of the displacement.

9. The door latch as claimed in claim 1, wherein the gripper is in the form of a rotary gripper having a gripping mouth which is delimited between two jaws and in which the rotary gripper is able to hold the closing member captive in the gripping state, wherein the gripping state and the release state correspond to different rotation positions of the rotary gripper and the rotary gripper in the gripping state is spring-biased for rotation in the direction toward the release state, wherein the rotary gripper is rotatably mounted on a movably arranged gripper carrier, wherein there is further mounted on the gripper carrier a locking element which is arranged so as to be movable relative to the gripper carrier and the rotary gripper and which in the gripping state of the rotary gripper is able to come into locking engagement with the rotary gripper, which locks the rotary gripper against rotation in the direction toward the release state but can be released by the relative releasing movement of the closing member, wherein a displacement of the rotary gripper from the retracted position into the advanced position is accompanied by a displacement of the gripper carrier.

10. The door latch as claimed in claim 9, wherein the gripper carrier is spring-biased in such a way that a displacement of the rotary gripper from the retracted position into the advanced position is accompanied by a displacement of the gripper carrier against spring force.

11. The door latch as claimed in claim 9, wherein the gripper carrier is a pivotably arranged carrier lever or a linearly movably arranged carrier slide.

12. The door latch as claimed in claim 9, wherein the displacement mechanism comprises the control member for controlling the position of the rotary gripper, which control member is formed separately from the gripper carrier, is arranged so as to be movable relative to the rotary gripper along a rotation plane of the rotary gripper and can be driven under electrical control, wherein there acts between the control member and at least one of the gripper carrier and the rotary gripper a control path-path follower formation having a control path and a path follower which travels along the control path as the control member is moved, wherein the control path has different path sections, of which a first defines the retracted position of the rotary gripper and a second defines the advanced position of the rotary gripper.

13. The door latch as claimed in claim 9, wherein the displacement mechanism comprises an electromotive actuator, and the gripper carrier is in meshing drive connection with a drive wheel driven by the actuator.

* * * * *